Patented June 1, 1937

2,082,193

UNITED STATES PATENT OFFICE 2,082,193

TREATMENT OF MASONRY WALL SURFACES

Walter F. Wells, Detroit, Mich., assignor of one-half to William Grund, Detroit, Mich.

No Drawing. Application January 13, 1934, Serial No. 706,557

5 Claims. (Cl. 91—68)

This invention relates to a protective waterproofing composition and the method of application. More particularly this invention relates to a protective covering and its application on porous masonry surfaces and joints to prevent the disintegration of the masonry by the elements of the weather.

It is well known that porous masonry surfaces and joints are susceptible to weather attacks and after a period of time begin to disintegrate, chip off, and recede producing an unsightly structure as well as a dangerous condition.

It is one of the primary objects of this invention to provide a protective covering for masonry surfaces and a method of applying this covering which is inexpensive, pleasing in appearance, and extends the life of the masonry.

Another object of this invention is to so apply this protective composition to the masonry surfaces and joints that it will enter all the pores and other openings which may be found therein and to utilize such ingredients in the composition which will cause the composition to swell in the pores completely filling the pores and preventing its dislodgement therefrom.

A further object is to provide a protective coating for masonry surfaces which prevents the surface from disintegrating under severe weather conditions and long use and also bars the entrance of water thereto.

A further object of this invention is to provide a protective coating for masonry surfaces which fills the porosities thereof and swells and hardens to present a smoother exterior surface; and a second coating of air and moisture impervious material which renders the entire surface of the masonry immune to the elements of the weather.

A further object of importance is to provide a treatment for porous masonry surfaces which includes a first coating which gradually changes color upon being exposed to the air and a second coating which when applied to the first coating prevents further color change and permanently preserves the color thus developed.

Other objects and features of this invention will appear from the following description and the appended claims.

This masonry treatment has been found to be not only beneficial in preserving new masonry constructions but also in repairing and filling up hardened and weather-affected mortar joints, stucco, concrete, artificial stone, plastered side walls, or other porous masonry surfaces and rendering the same impervious to moisture. The treatment consists, in general, in applying two coats of protective material to the masonry surfaces, the first coat providing a filler and a hardener for the pores of the masonry, and the second coat rendering the first coat impervious to air and moisture and as a consequence strengthening the weather resisting qualities of the first coat to produce a permanent weather proof covering for the masonry surfaces.

A practical and satisfactory method of treating the masonry surfaces comprises providing for the first coating a composition including cement and an oxidizable metal such as iron therein. Very satisfactory results have been obtained from the following composition:

| | Parts |
|---|---|
| Cement (Portland, White Medusa or Atlas) | 10 |
| Fine sand | 4 |
| Lime | 1 |
| Finely pulverized iron | 1½ |
| Finely ground clay | 2 |

A sufficient amount of water is added to make the composition plastic. The finely ground clay is a desirable addition in order to hold the iron particles and the other ingredients in suspension in the mixture. The advantage of adding clay is to be particularly found when the mixture is in containers prior to application upon the masonry surfaces. The iron particles and other ingredients are prevented from settling to the bottom thus relieving the operator of the task of constantly stirring the mixture and insures that the same quality of coating will be distributed equally over the masonry surface.

This first coating is applied to the mortar joints or over the entire surface of the masonry if desired by brushing and rubbing the compositions into the surface. After the coating has become partially dry, the surplus material is removed by wiping off with clean cloths leaving enough material on the masonry surface to thoroughly fill up the joints and pores.

The materials in the first coating will begin to oxidize or rust after a period of time and this is noticeable when a brownish color appears over the surface of the coating. The oxidation of the metal causes the coating to swell and completely fill up the pores and openings in the masonry aiding in the adhering of the coating to the masonry. In order to hasten the oxidation of the iron it is desirable to keep the first coat in a dampened state, and in dry weather it is advisable to wet the coating down at intervals of time. Although it requires approximately eight days for the metal to rust and to insure proper results, this period may be varied by the use of different materials or various oxidizing accelerators.

If this filler and hardener coating were left exposed on the masonry surface it would begin to disintegrate after a period of time from the moisture and the changing temperature conditions affecting it, and the color of the coating would deepen into a black shade due to the rusting of the metal therein. In order to strengthen the weather resisting qualities of this coating and to prevent further oxidation of the metal it is necessary to apply a film or second coating of material which is impervious to both air and water over the first coating. A penetrating waxy composition consisting of the following ingredients has been found to be satisfactory in preserving the first coating:

| | Per cent |
|---|---|
| Ozokerite wax | 5 to 10 |
| Partially refined gasoline | 90 to 95 |

The ozokerite is a natural, paraffin-like substance and contains a small quantity of oily matter. White rose oil may be a beneficial addition to the ozokerite to toughen it. Turpentine, kerosene or gasoline may be used in place of the partially refined gasoline, but the best results have been obtained from a product intermediate kerosene and gasoline, and this product has been denoted as a partially refined gasoline. This whole composition is transparent and when applied to masonry surfaces or to the first coat enables either to appear as it did before the application.

The second coating is applied when the first filler coat has thoroughly set and the pulverized iron therein has oxidized to such an extent as to appear slightly brown. This wax coat is painted or otherwise applied to the surface of the first coat and it penetrates the pores of the first coat and any masonry surface nearby to provide a waterproof and airproof film. The cutting off of the air to the first coat immediately prevents any further oxidation of the metal and the color of the coat, due to the transparency of the second coat, is preserved at its developed stage. The second coat renders the first coat resistant to all weather conditions and as a result prevents any loosening and crumbling of the first coat.

The second coat may be applied at any period in the oxidation of the metal in the first coat, and it is entirely possible to regulate the shade of color of the masonry surface to either a light, medium or dark shade in order to correspond with the original color of the masonry surface or any outside trim.

While there has been described two particular compositions and a desirable method of applying the same which have been found to benefit masonry surfaces, it is to be understood that such or similar compositions may be applied to the surfaces of other materials, and that such description herein is relative to only one embodiment of the invention and that various changes in the formulas and the compositions themselves and the method of applying the same may be made without departing from the spirit of the invention.

What I claim:

1. The method of providing a waterproof protective covering for porous masonry surfaces which comprises applying to the surface a first coating containing cement and pulverized iron, forcing this first coating into the porosities of the masonry surface to fill the same and to present a smoother exterior, maintaining the first coating in a dampened state to hasten the oxidation of the iron, and upon partial oxidation of the iron applying a second coating of waxy substance which penetrates the porosities of the first coating to form a moisture resistant layer rendering the entire covering on the masonry surface impervious to moisture and preventing further oxidation.

2. The method of providing a waterproof protective covering for porous masonry surfaces which comprises applying to the surface a filling and a hardening composition including cement and pulverized oxidizable metal as ingredients, forcing the composition into the pores of the masonry surface to fill the same, allowing the composition to partially harden, removing substantially all of the surplus composition, maintaining the composition in a dampened state to hasten the oxidation of the metal, and applying a coating of penetrating waterproof wax composition to the outer surface of said first mentioned composition when the metal therein begins to oxidize to prevent further oxidation thereof and render the covering for the masonry surface impervious to moisture.

3. The method of filling porous masonry surfaces to prevent the penetration of water which comprises applying to the surfaces a coating composition which includes as ingredients cement and pulverized iron, forcing the composition into the surface of the masonry surface to fill the porosities therein, wiping off substantially all of the surplus material after the composition has been allowed to partially set, maintaining the composition in a dampened condition to delay the setting of the composition and to hasten the oxidation of the iron, allowing the iron to oxidize to a light brown, and then applying a second coat to the masonry surface which consists of a penetrating waxy material which fills the porosities in the first coating and renders the coating impervious to moisture.

4. The method of waterproofing exposed porous masonry surfaces which comprises applying a mixture including cement and an oxidizable metal to the surface of the masonry, rubbing said material into the pores of said masonry, removing substantially all the surplus material of said layer after it has been allowed to partially set, retaining the layer in a dampened condition until the metal therein has begun to color in oxidation, and then applying a coating of transparent penetrating wax to the exposed surface of said layer to prevent further oxidation and to render the masonry surface waterproof.

5. The method of providing a waterproof protective coating for masonry surfaces which comprises applying to a masonry surface a filling and hardening composition including substantially in the proportions named, ten parts of cement, four parts of fine sand, one part of lime, and one and a half parts of finely pulverized iron; and subsequently applying to said coating a composition containing substantially 5% to 10% ozokerite wax dissolved in a volatile vehicle.

WALTER F. WELLS.